United States Patent [19]

Kobayashi

[11] 4,398,881
[45] Aug. 16, 1983

[54] APPARATUS FOR FORMING SOFT FOOD MATERIAL INTO GLOBULAR SHAPE

[76] Inventor: Masao Kobayashi, 38-9, 3-Chome, Ninomiya, Fukui-Shi, Fukui-Ken, Japan

[21] Appl. No.: 377,557

[22] Filed: May 12, 1982

[30] Foreign Application Priority Data

May 13, 1981 [JP] Japan .................................. 56-72499
Aug. 27, 1981 [JP] Japan ................................ 56-134916
Oct. 3, 1981 [JP] Japan ................................ 56-157743

[51] Int. Cl.³ .......................... A21C 3/04; A21C 7/04; A21C 11/16
[52] U.S. Cl. ....................................... 425/235; 17/32; 425/297; 425/298; 425/307; 425/325; 425/332; 425/408
[58] Field of Search .................... 17/32; 425/296, 297, 425/305.1, 308, 332, 335, 371, 372, 235, 233, 306, 307, 313, 377, 408, 409, 237, 298, 324.1, 325

[56] References Cited

U.S. PATENT DOCUMENTS

| | | | |
|---|---|---|---|
| 1,671,079 | 5/1928 | McManus | 425/408 |
| 2,176,945 | 10/1939 | Roberts | 425/233 |
| 2,327,245 | 8/1943 | Bridge | 425/335 |
| 2,483,638 | 10/1949 | Howe | 425/233 |
| 2,919,664 | 1/1960 | Marasso | 425/308 |
| 4,050,873 | 9/1977 | Brumlik et al. | 425/335 |
| 4,278,625 | 7/1981 | Dedolph | 425/220 |

Primary Examiner—Willard E. Hoag
Attorney, Agent, or Firm—James D. Halsey, Jr.

[57] ABSTRACT

This invention relates to an apparatus for forming soft and sticky food material such as kneaded mixture of water and rice flour, wheat flour, etc., into globular shape in formation chambers in the form of pipe. Four crossing members constitute one group and create a formation chamber in the form of pipe. The crossing members on one side of the formation chambers are made to reciprocate in the opposite directions to those on the other side thereof, while touching, whereby the material is kneaded into globular shape.

8 Claims, 10 Drawing Figures

APPARATUS FOR FORMING SOFT FOOD MATERIAL INTO GLOBULAR SHAPE

BRIEF SUMMARY OF THE INVENTION

This invention relates to an apparatus for forming soft food material into globular shape, and more particularly to an apparatus for forming soft and sticky food material as used for making confectionery, bread, etc., into globular shape.

The soft food material used for making Japanese confectionery which is something like "Turkish delight" is whitened rice flour kneaded with water, steamed an then mixed with sugar or starch syrup, and such material is very soft and sticky. Heretofore, no apparatus for forming such soft and sticky food material into globular shape has not yet been presented and generally confectionery craftsmen have been forming the said material into globular shape using thier own hands. Therefore, it was impossible to mass-produce the formation of the said material into globular shape and thus to decrease the production cost. Also it was impossible to prevent bacteria from mixing into the material owing to the contact with the hands in formation process. Various problems have been pointed out that this mixture of bacteria causes the material to be very insanitary and that the propagation of bacteria results in shortening the preservation period of the material.

The inventor has been making studies for many years of the technique of mechanically processing the soft food material and has succeeded in putting to practical use "Machine for processing soft coating material" whereby it is pushed out in the form of sheet and then cut into desired shape, as disclosed under Japanese Patent Publication No. 56-1055, and "Apparatus for wrapping coating material" whereby the material thus pushed out and cut is folded for wrapping, as disclosed under Japanese Pat. Publication No. 56-3009.

It is an object of the present invention as well as the inventions of the above-mentioned Publications, to provide an apparatus for mechanically processing and forming soft food material into desired shape, and among all, to provide an apparatus for pushing out the soft food material in the form of column, cutting the pushed-out material into a certain size and forming the cut material into globular shape by kneading. This apparatus will make it possible to mechanically form the soft food material into globular shape, thereby resulting in mass-production and consequently decrease in cost, and furthermore to prevent bacteria from mixing into the material since manual process is no longer necessary, thereby keeping the said material in sanitary condition and lengthening its preservation period.

It is another object of the present invention to provide an apparatus wherein the cutting process is improved by a twist-giving means which twists out the soft food material in alternate directions around its longitudinal axis when pushing it out in the form of column and by cutting edges, for cutting this twisted-out material, horizontally reciprocating the direction vertically intersecting the said longitudinal axis, in cooperation with the movement of the said twist-giving mens.

It is still another object of the present invention to provide cutting edges which enable it to cut the said columnarly pushed-out material with efficiency and to facilitate it to form the cut ends thereof into globular shape by kneading them inwardly.

It is still a further object of the present invention to provide an apparatus for forming soft food material into globular shape with secondary food material such as bean-jam being contained therein.

It is still more a further object of the present invention to provide an apparatus for forming soft and sticky food material other than the aforementioned material, namely dough mixed with flour and water, etc., for making bread; mixture of flour and water with seasoned mixture of ground meat and cut vegetables contained therein, for making a Chine manto or meat bum; or any other similar material, into globular shape.

The foregoing objects and other object as well as the characteristics of the present invention will become more apparent and more readily understandable by the following description and the appended claims when read in conjunction with the accompanying drawings.

BRIEF DESCRIPTION OF THE DRAWINGS

FIG. is is a diagrammatic elevational view of an apparatus, in its entirety, for forming the soft food material into globular shape according to the present invention.

DETAILED DESCRIPTION OF THE INVENTION

Figure 1:
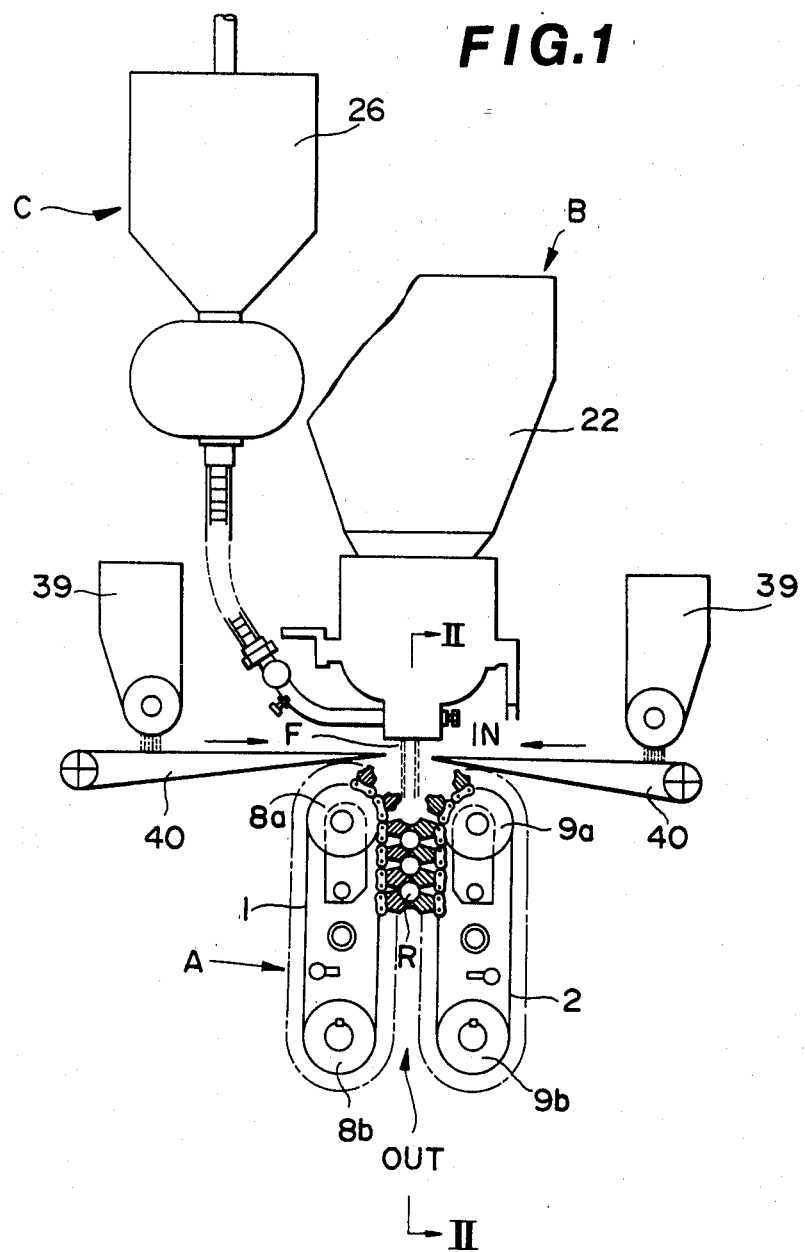

Referring to FIG. 1, above a formation means A for forming soft food material F into globular shape is positioned a first supply means B for pushing out main soft food material F1 in the form of column. The first supply means B is connected with a second supply means C for supplying secondary soft food material F2 to be contained in the said main material F1 which is destined to be formed into globular shape. The soft food material F consists of the said main material F1 and the said secondary material F2 to be contained therein. The soft food material F, however, can only consist of the said main material F1, and therefore it does not always require the said secondary material F2.

The formation means A comprises a pair of caterpillar belts 1 and 2 which move endlessly. The said pair of caterpillar belts 1 and 2, having a certain length in the certical direction, move so that they join with each other in an upper position, move downwardly for a certain section keeping the joining condition and then part from each other in a lower position. The said pair of caterpillar belts 1 and 2 have desirable length in the horizontal direction and horizontally reciprocate in the opposite directions to each other. It is to be noted that this movement of the said pair of caterpillar belts 1 and 2, namely horizontal reciprocating movement in the opposite directions to each other while keeping the joining condition, is very important for cutting and forming into globular shape the soft food material supplied by the supply means.

Figure 10:
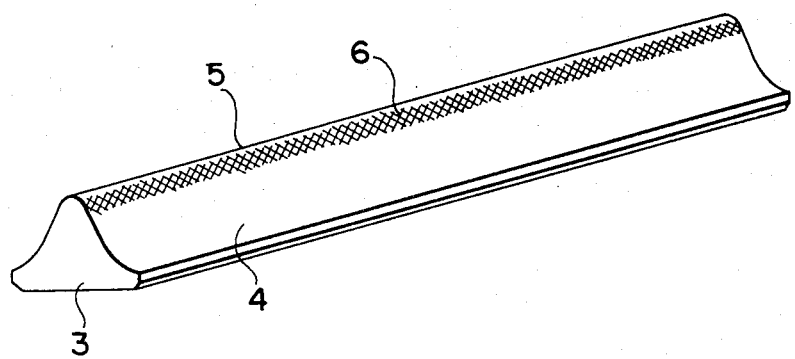
FIG. 10 is a perspective view of a crossing member having cutting edges.

Each of the said pair of the caterpillar belts 1 and 2 includes a plurality of crossing members 3 and a pair of chains 7. The crossing members 3 are provided along the width of the said caterpillar belts 1 and 2 around the outer circumferential surfaces thereof. When the said pair of caterpillar belts 1 and 2 join with each other, a formation chamber which extends horizontally in the form of pipe is created by one group of four adjacent crossing members, namely the adjacent two upper and lower crossing memebers on one caterpillar belt and the corresponding two crossing members on the other. The cross-section of the said crossing member 3 is like a chevron or a triangle, as shown in FIG. 10. Both sides 4 thereof are formed in an arc corresponding to a quadrant, respectively, and each of the said sides 4 is provided, near a top 5, with a cutting edge which is impressed with knurling, etc., extending in the longitudinal direction.

Each of the said pair of caterpillar belts 1 and 2 comprises of a pair of symmetrical chains 7 which are connected successively and disposed apart from each other at a distance along the width of the caterpillar belt. The said crossing members 3 bridge the said pair of symmetric chains 7 and are fixed thereon. The catpillar belts 1 and 2 are carried around a pair of upper and lower sprockets 8a–8b and 9a–9b, respectively. In the embodiment shown in the drawings, the lower are driving sprockets 8b and 9b while the upper are follower sprockets 8a and 9a. The said follower sprockets 8a and 9a are movably mounted by oscillating links 10 and 11, respectively. If necessary, the caterpillar belts 1 and 2 may be easily removed by tilting the said oscillating links 10 and 11.

Figure 3:
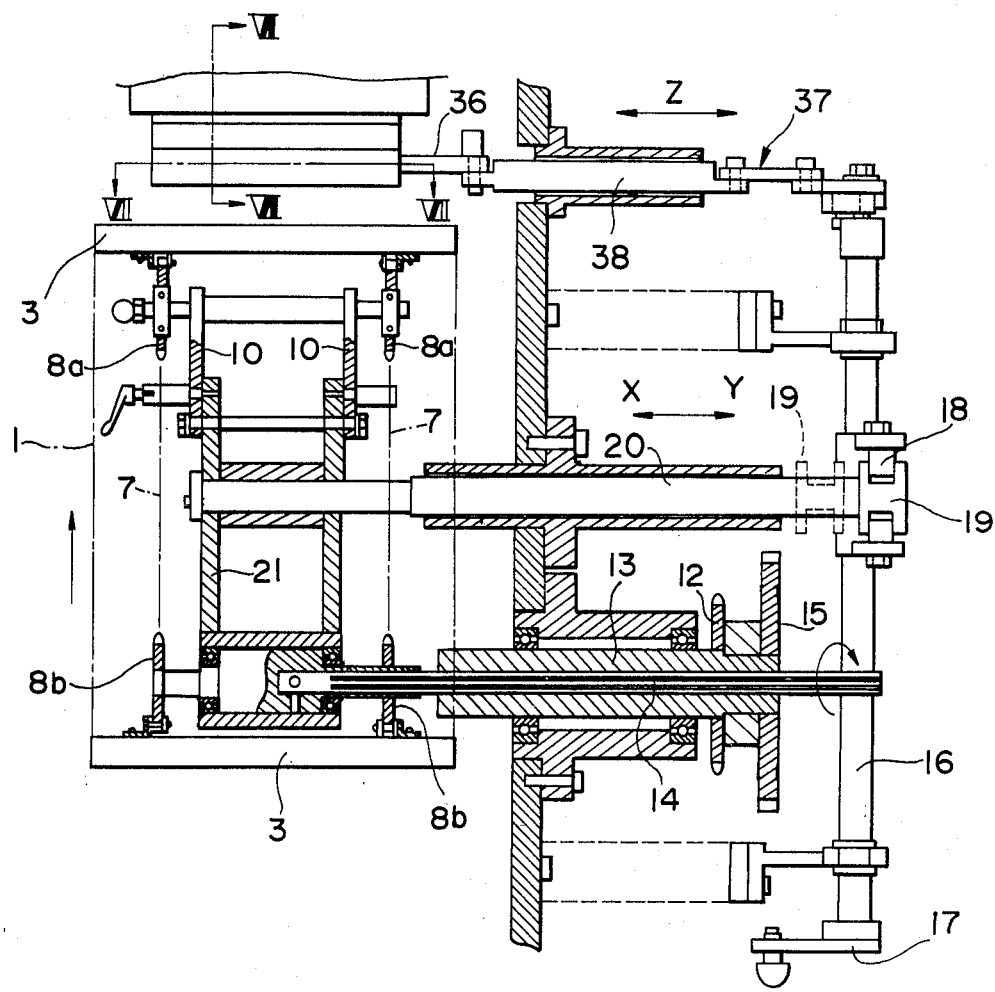
FIG. 3 is a partially sectional elevational view of connection between and cooperating mechanism of the said caterpillar belts and a twist-giving means.
Figure 4:
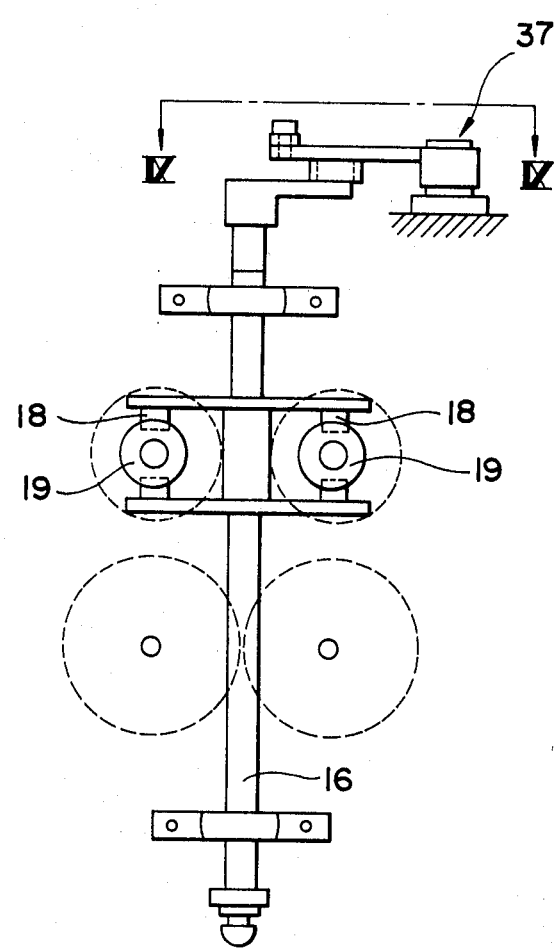
FIG. 4 is an elevational view of the connection and cooperative mechanism of FIG. 3, viewed from the right side thereof.

Referring to FIG. 3, a transmission sprocket 12, which is connected to a proper power source, rotates a spline cylinder 13 and a spline shaft 14 inserted therein. The spline shaft 14 rotates integrally with the said spline cylinder 13 and it can also slide in its axial direction. The said spline shaft is connected with the driving sprocket 8b, thereby driving the caterpillar belt 1. In order to drive the other caterpillar belt 2, a further spline cylinder and a further spline shaft connected with the driving sprocket 9b are disposed in parallel with the said spline cylinder 13 and shaft 14, respectively. The said further spline cylinder is made to synchrously rotate in the opposite direction to the said spline cylinder 13 via an intermediate gear 15 fixed coaxially with the said transmission sprocket 12. In this way, the said pair of caterpillar belts 1 and 2, while reciprocating the the horizontal direction, move endlessly so that they join with each other in the upper position, move downwardly for a certain section keeping the joining condition and part from each other in the lower position .

The numeral 16 is an oscillating shaft which is made to turn in alternate directions at a certain angle by an oscillating lever 17. A pair of oscillating cams 18 are disposed symmetrically to the said shaft 16 at desired upper part thereof. The said pair of oscillating cams 18 engage a pair of cam followers 19, respectively, with each of which is connected one end of a reciprocating rod 20 horizontally extending in parallel with the corresponding spline shaft. The other end thereof is fixed at a support frame 21 for supporting the sprockets of the said caterpillar belts 1 and 2. When it oscillates by means of a proper power sourse, the oscillating lever 17 turns the oscillating shaft 16 in alternate directions at a certain angle, thereby the pair of oscillating cams 18 disposed symmetrically to the said oscillating shaft 16 oscillates in the opposite directions to each other. Therefore, the two reciprocating rods 20, which are connected with the said cam followers 19 oscillating in engagement with the said oscillating cams 18, reciprocate in the directions of an arrow X–Y of FIG. 3 so that one reciprocating rod moves in the X direction while the other moves in the Y direction, and vice versa.

By the movement of the said pair of caterpillar belts 1 and 2 in the horizontal opposite directions to each other, the soft food material F is horizontally kneaded round in the formation chamber R created by the said four crossing members 3 in the form of pipe and it is formed into globular shape all the better for the cross-section of the chamber being circular. Furthermore, the said movement of the said pair of caterpillar belts 1 and 2, the said cutting edges 6 of the joining crossing members can cut, while kneadning, the soft food material F pushed out in the form of column from up above. This kneading-cutting operation of the said crossing members extremely facilitates it to cut the columnar material and furthermore the outer part of the said material is kneaded inwardly since the cutting edges 6 horizontally reciprocates, the knurling thereof catching the cut end of the said material F. As a result, the cut end thereof is made beautiful and therefore it is not necessary to give treatment to it when the operation suspends. In addition, it is possible to form very satisfactorily the soft food material into globular shape with the secondary food material contained therein.

The embodiments of the said first and second supply means B and C are shown in FIGS. 5 to 8. The first supply means B is connected with the second supply means C, from which the secondary food material F2 such as bean-jam is inserted into the center part of the main soft food material F1, which is pushed out in the form of column from the first supply means B.

The first supply means B comprises a hopper 22 to be loaded with the main material F1 and a gear pump 23 for pumping it out in the form of column through a plurality of openings D1, three of which are provided in the embodiment. Namely, the food material F is pushed out in the form of three columns through the three openings D1 and then supplied to the formation means A where it is formed into three globular shapes at the same time. The inflow of the main material F1 pushed out through openings D1 is balanced by a flow-direction control know 24 for turning ladder plates 25.

The second supply means C comprises a hopper 26 to be loaded with the secondary material F2, a screw blade 27 for sending it out, and a gear pump for pumping it out through a pipe 28 to a diverging chamber 29, then to diverging pipes 30, and finally to opening D2 so that it is pushed out axially with the center part of the main material F1 columnarly pushed out. The inflow of the secondary material F2 flowing the the diverging pipes 30 can be controlled by inflow control cocks 32.

Figure 5:
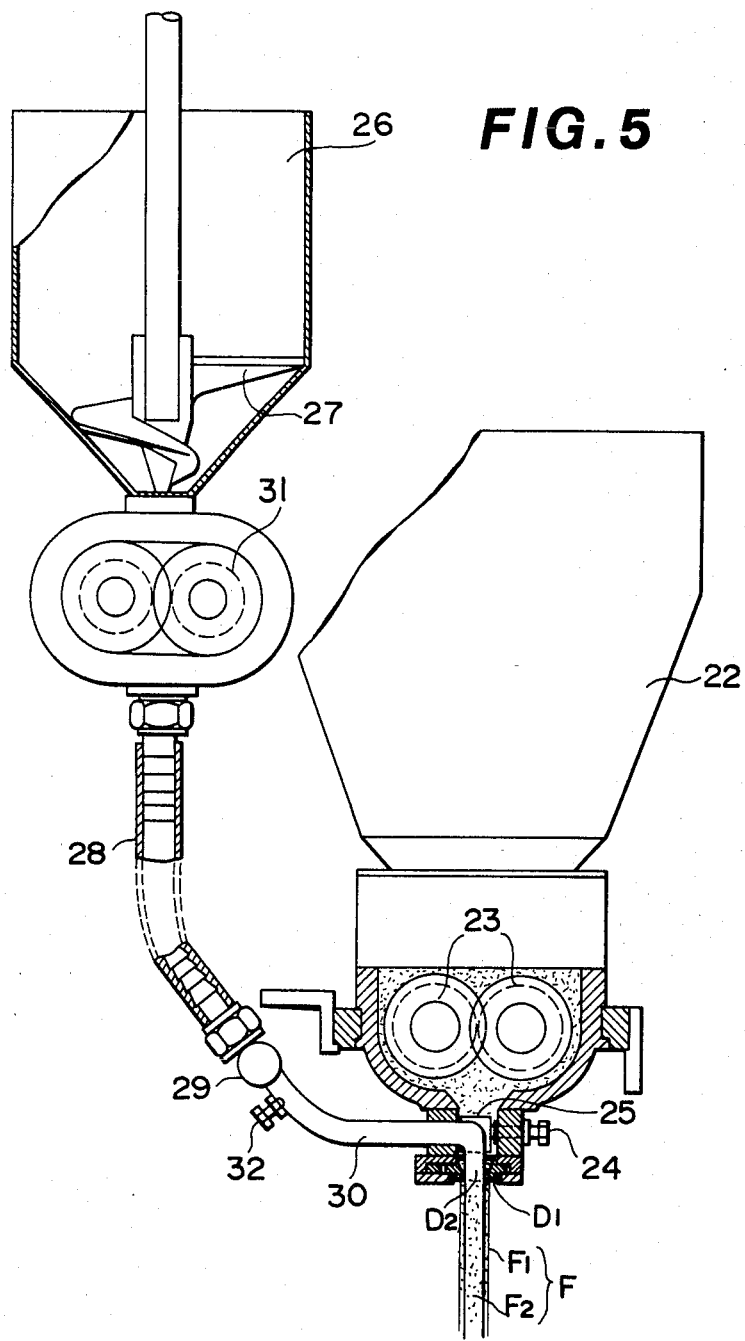
FIG. 5 is a diagrammatic elevational view of a first supply means for supplying main soft food material and a second supply means for supplying secondary soft food material to be contained therein.
Figure 6:
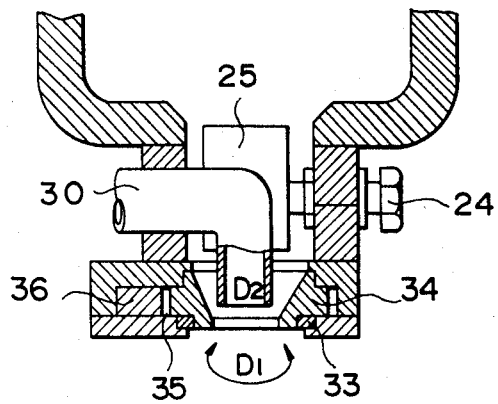
FIG. 6 is a vertical sectional view of push-out nozzles of the said first supply means, taken on the line of VI—VI of FIG. 3.
Figure 7:
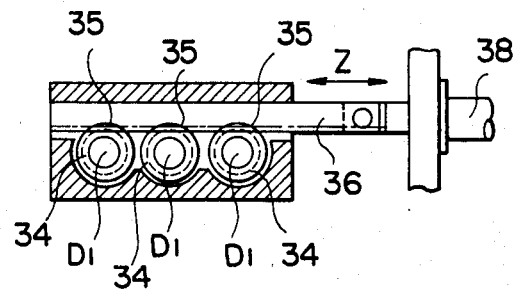
FIG. 7 is a transverse sectional view of the said push-out nozzles, taken on the line VII—VII of FIG. 3.
Figure 8:
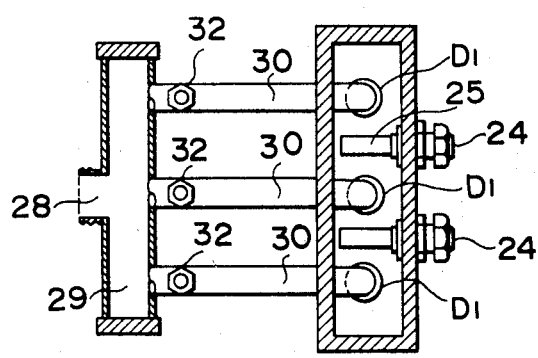
FIG. 8 is a partially transverse sectional view of the connection between the said push-out nozzles and the second supply means.
Figure 9:
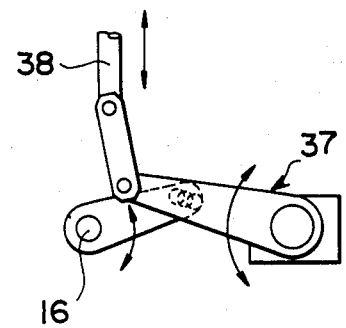
FIG. 9 is a plan view of a linkage viewed from the line IX—IX of FIG. 4.

Push-out nozzle area of the first supply means B, as shown in FIGS. 5 to 7, consists of rotatable nozzles 34 which are rotatably mounted on bearings 33 and have the openings D1. The outer circumferenctial surfaces of the said rotatable nozzles are provided with pinion gears 35, which mesh with a rack 36 horizontally reciprocating in the direction of an arrow X. The rack 36 is connected to the upper part of the said oscillating shaft 16, which turns in alternate directions at a certain angle, through a reciprocating horizontal rod 38 and a linkage 37 (See FIG. 9).

Therefore, the soft food material F pushed out in the form of column from the supply means B and C is made to turn in alternate directions around its longitudinal axis, thereby it is twisted out therefrom.

Powder which is sent out from hoppers 39 positioned on the right and left sides of the columnarly pushed-out material F is transferred on conveyor belts 40 so as to coat the said material F therewith. This coating prevents the said material F from adhering to the inner walls of the formation chamber R, thereby quaranteeing satisfactory formation of the said material F into globular shape.

Since the said pair of caterpillar belts 1 and 2 are disposed to face each other below the said supply means B and C so as to put the path therebetween in which the said columnarly pushed-out material F descends, the said group of crossing members 3 gradually join while they horizontally reciprocate in the opposite directions, as mentioned above, vertically intersecting the longitudinal axis of the said material F (in the direction of the arrow X-Y of FIG. 3), the cutting edges thereof rubbing the outer circumferenctial surface of the said material F while reciprocating at the same speed with that at which the said material F turns, thereby they finally cut the said material F at IN position of FIG. 1 while kneading it. As the said twist-giving means makes the said material F to twist and turn in alternate directions in coopeartion with the reciprocating cutting edges 6, this mechanical kneading-cutting process is an effective as or more effective than the manual process.

After that the cut portion of the said material F is subjected to the movement of the inner walls of the formation chamber R created by the said group of the joinin crossing members, the movement being such that the inner walls on one caterpillar reciprocates in the opposite directions to those on the other, and the cut portion is rounded into globular shape. The globularly formed portion is then released from the formation chamber R when the said crossing memebers part from each other at OUT position and consequently cease to create the formation chamber R.

In the drawings, the rotatable nozzles 34 having opening D1 are made to turn in alternate directions by such mechanism that the pinion geats 35 thereof mesh with the rack 36 reciprocating with the horizontal rod 38 which reciprocates via the linkage 37 provided at the end of the oscillating shaft 16 which oscillates the caterpillar belts 1 and 2. However, this movement of the said rotatable nozzles 34 may be obtained by other synchronous connecting mechanism.

Figure 2:
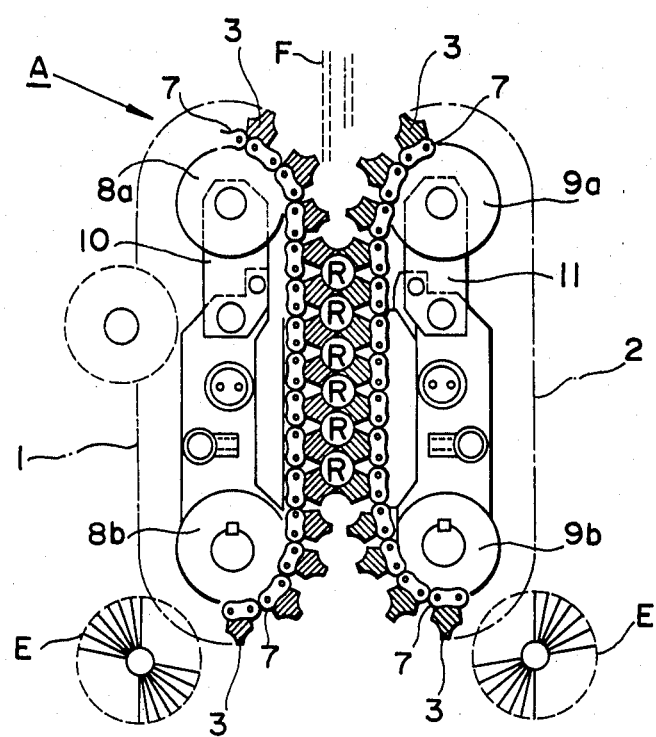
FIG. 2 is an enlarged elevational view of caterpiller belts taken on the line II—II of FIG. 1.

Referring to FIG. 2, E indicates brushing members for brushing off the powder or food material that adheres to the crossing members 3.

While I have shown and described a certain preferred embodiment of the present invention, it is to be distinctly understood that the present invention is not limited thereto but may be otherwise modified within the scope of the appended claims. For example, it is possible to integrally form the caterpillar belt with semi-rigid flexible plastic material and to drive it with the inner side thereof being formed as a timing belt of a known type. Furthermore, it is possible, unlike the embodiment, to lay down the caterpillar belts 1 and 2 so that the soft food material F to be processed is transferred in the horizontal direction to be formed into globular shape.

What is claimed is:

1. An apparatus for forming soft food material into globular shape comprising:
   (a) a pair of endless moving means disposed so as to join with each other at one position and to part from each other at the other position after keeping the joining condition, the said pair of endless moving means including a plurality of crossing members mounted thereon and adapted for creating formation chambers in the form of pipe when the said pair of endless moving means join with each other; and
   (b) means for horizontally reciprocating the said pair of endless moving means in the opposite directions to each other vertically intersecting the direction of the said pair of endless moving means, thereby reciprocating the inner walls of the said formation chambers in the opposite directions to each other so as to form the said material into globular shape.

2. An apparatus for forming soft food material into globular shape as claimed in claim 1 comprising supply means for pushing out the said material in the form of column wherein the said pair of endless moving means are disposed facing each other so as to put the columarly pushed-out material therebetween so that the said crossing members, while horizontally reciprocating in the opposite directions to each other vertically intersecting the said material, gradually approach to join, thereby creating one formation chamber after another, and then part from each other.

3. An apparatus for forming soft food material into globular shape as claimed in claim 1 comprising supply means for pushing out the said material in the form of column wherein the said pair of endless moving means are provided successively with the said crossing members, each of which is formed like a chevron and has cutting edges on both sides of its top, the said cutting edges being formed with knurling impressed longitudinally extending along the top, and the said pair of endless moving means are disposed facing each other so as to put the said columnarly pushed-out material therebetween so that the said crossing members, while horizontally reciprocating in the opposite directions to each other vertically intersecting the longitudinal axis of the said material, gradually join with each other, thereby the said cutting edges cutting the said material by kneading.

4. An apparatus for forming soft food material into globular shape as claimed in claim 1 wherein supply means for sending out said material in the form of column is disposed on the side where the said pair of endless moving means join with each other.

5. An apparatus for forming soft food material into globular shape as claimed in claim 14 comprising:
   (a) a pair of caterpillar belts including a plurality of crossing members provided around the outer circumferential surfaces thereof and cutting edges formed on the said crossing members;
   (b) means for horizontally reciprocating the said pair of caterpillar belts in the opposite directions to each other; and (c) supply means for pushing out the said material in the form of column wherein the said pair of caterpillar belts are disposed side by side so as to join at IN position while horizontally reciprocating in the opposite directions to each other, thereby the said crossing members creating formation chambers in the form of pipe, and to part from each other at OUT position, the said material pushed out in the form of column being caught by the said cutting edges at the said IN position, cut into a certain size and then introduced into the said formation chamber where the said material is to be formed into globular shape, and finally released therefrom at the said OUT position.

6. An apparatus for forming soft food material into globular shape as claimed in claim 4 or 5 wherein a twist-giving means for turning the said material in alternate directions around its longitudinal axis is provided at push-out nozzle area of the said supply means for pushing out the said material in the form of column.

7. An apparatus for forming soft food material into globular shape as claimed in claim 6 wherein the said twist-giving means is cooperated with the movement of the said crossing members reciprocating in the opposite directions to each other.

8. An apparatus for forming soft food material into globular shape as claimed in claim 6 wherein the said material pushed out in the form of column from the said push-out nozzle area of the said supply means is made to synchronously turn alternately in the same direction and at the same speed with the horizontally reciprocating movement of the said crossing members.

* * * * *